United States Patent [19]

Yago et al.

[11] Patent Number: 5,566,897
[45] Date of Patent: Oct. 22, 1996

[54] PHOTOGRAPHIC FILM TAKE-UP DEVICE AND METHOD

[75] Inventors: Atsushi Yago; Katsuhiko Tanaka, both of Kanagawa, Japan

[73] Assignee: Fuji Photo Film Co., Ltd., Kanagawa, Japan

[21] Appl. No.: 245,007

[22] Filed: May 18, 1994

[30] Foreign Application Priority Data

May 18, 1993 [JP] Japan .................................. 5-138920

[51] Int. Cl.$^6$ .................................................. G03D 15/00
[52] U.S. Cl. ................................ 242/348.1; 242/532.4; 242/532.7; 242/584.1
[58] Field of Search ........................... 242/348.1, 348.4, 242/532.4, 532.7, 562, 562.1, 584.1

[56] References Cited

U.S. PATENT DOCUMENTS

| | | | |
|---|---|---|---|
| 3,481,552 | 12/1969 | Gersch et al. | 242/584.1 X |
| 3,586,258 | 6/1971 | Horlezeder | 242/532.7 X |
| 3,921,278 | 11/1975 | Basu | 242/562.1 X |
| 4,138,068 | 2/1979 | Kinoshita | 242/562 X |
| 4,506,843 | 3/1985 | Luhrig et al. | 242/584.1 |
| 4,834,306 | 5/1989 | Robertson et al. | |
| 4,846,418 | 7/1989 | Fairman | |
| 4,852,821 | 8/1989 | Harris et al. | 242/584.1 |
| 5,360,183 | 11/1994 | Takahashi et al. | 242/584.1 X |

FOREIGN PATENT DOCUMENTS

| | | |
|---|---|---|
| 0582852 | 2/1994 | European Pat. Off. . |
| 49-107732 | 10/1974 | Japan . |
| 52-77723 | 6/1977 | Japan . |
| 60-48748 | 10/1985 | Japan . |
| 2691 | 1/1990 | Japan . |
| 337645 | 2/1991 | Japan . |
| 4-123048 | 4/1992 | Japan . |
| 4-122925 | 4/1992 | Japan . |

Primary Examiner—Daniel P. Stodola
Assistant Examiner—William A. Rivera
Attorney, Agent, or Firm—Sughrue, Mion, Zinn, Macpeak & Seas

[57] ABSTRACT

A photographic film take-up device having: a holding device for holding a cartridge main body accommodating a spool having a trailing end engaging member in an interior thereof, the trailing end engaging member engaging a trailing end portion of an elongated photographic film, an interior portion of the cartridge main body being shielded from light; and a guiding member having an engaging portion which engages the longitudinal direction trailing end portion of the film, and engaging the engaging portion with the trailing end portion of the film, and guiding the engaging portion and the trailing end portion of the film to the spool via a film path provided in the cartridge main body, and engaging the trailing end portion of the film with the trailing end engaging member. The engaging portion is provided at a leading end portion of the guiding member in a direction of guiding the film to the spool, and engages an engagement hole provided in a central portion of the film at the longitudinal direction trailing end portion thereof. When the engagement portion is engaged with the engagement hole of the trailing end portion of the film, curling of the film such that a longitudinal direction central portion thereof is separated from the guide member can be deterred. Guiding and engagement can be effected smoothly and reliably.

13 Claims, 12 Drawing Sheets

PRIOR ART

PRIOR ART

PRIOR ART

FIG. 16

PRIOR ART

PHOTOGRAPHIC FILM TAKE-UP DEVICE AND METHOD

BACKGROUND OF THE INVENTION

1. Field of the Invention

The present invention relates to a photographic film take-up device for taking up a photographic film into a cartridge main body when a photographic film cartridge is assembled.

2. Description of the Related Art

A cartridge for 135 type photographic film, which is the most widely used photographic film, is formed of a cartridge main body structured by a cartridge body, which is a thin metal plate formed into a cylindrical shape, and two caps. A spool on which the photographic film is wound is accommodated in the cartridge. Japanese Patent Application Publication No. 2-691 discloses a method of assembling such a photographic film cartridge in which a photographic film which has been taken up on a spool is placed into the cartridge main body by operations carried out in a dark room. Further, as disclosed in Japanese Patent Application Publication No. 60-48748, a cartridge main body which is assembled once is separated into portions at a photographic film incorporation station within a dark room. A spool on which a photographic film has been wound is inserted therein, and the cartridge main body is then reassembled.

Moreover, in Japanese Patent Application Laid-Open Nos. 49-107732 and 52-77723, a cartridge main body having an empty spool is formed in a light room. A tongue-shaped guide plate is inserted into a film path formed in the cartridge main body. The photographic film is inserted into the cartridge main body from the trailing end portion thereof with the guide plate serving as a guide. After the trailing end portion of the photographic film engages with the spool, the spool is rotated so that the photographic film is taken up in the cartridge main body.

In accordance with the specifications of U.S. Pat. Nos. 4,834,306 and 4,846,418 as well as Japanese Patent Application Laid-Open No. 3-37645, the cartridge main body is assembled as a resin product, and a photographic film cartridge having the function of delivering the photographic film out of the cartridge main body due to the rotation of the spool is disclosed. These photographic film cartridges differ from their predecessors in so far as the leader portion of the photographic film does not protrude from the cartridge main body regardless of whether the photographic film is unused or has been used. The photographic film can thus be more reliably accommodated so as to be shielded from light, and the handling of these photographic film cartridges before and after use thereof is easy.

Figure 10:
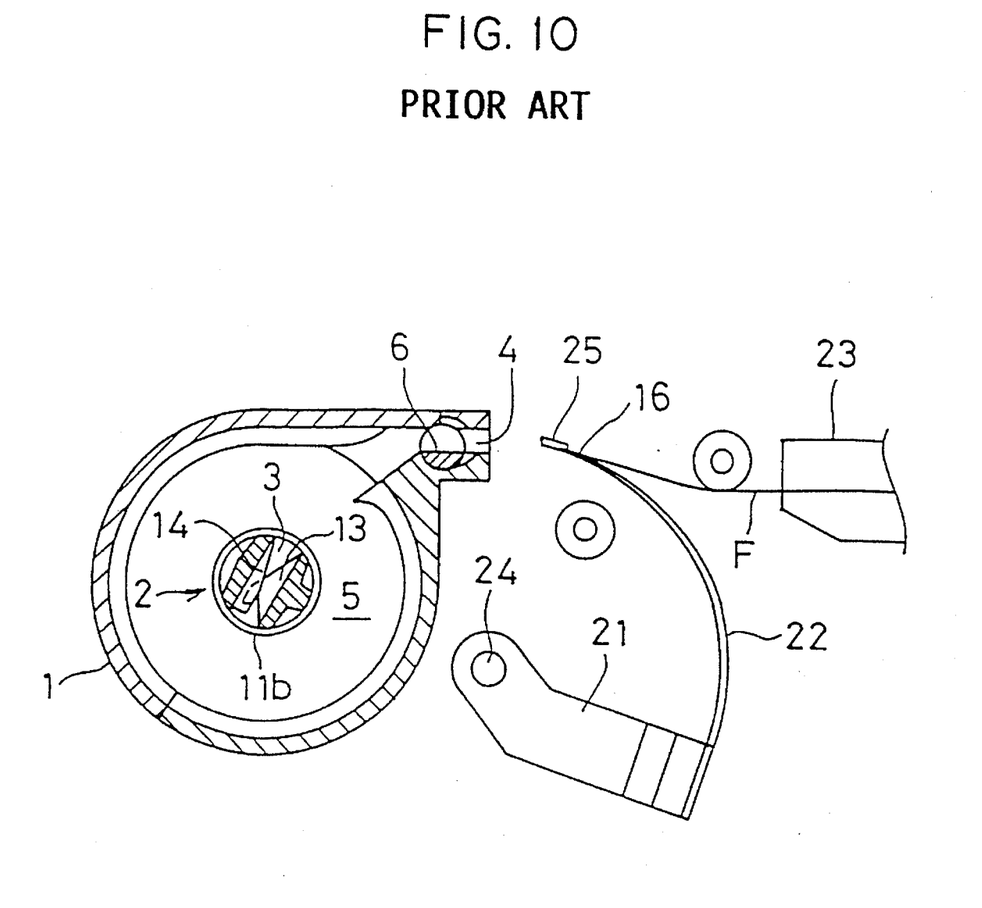
FIG. 10 is an explanatory view explaining a conventional photographic film take-up operation.
Figure 11:
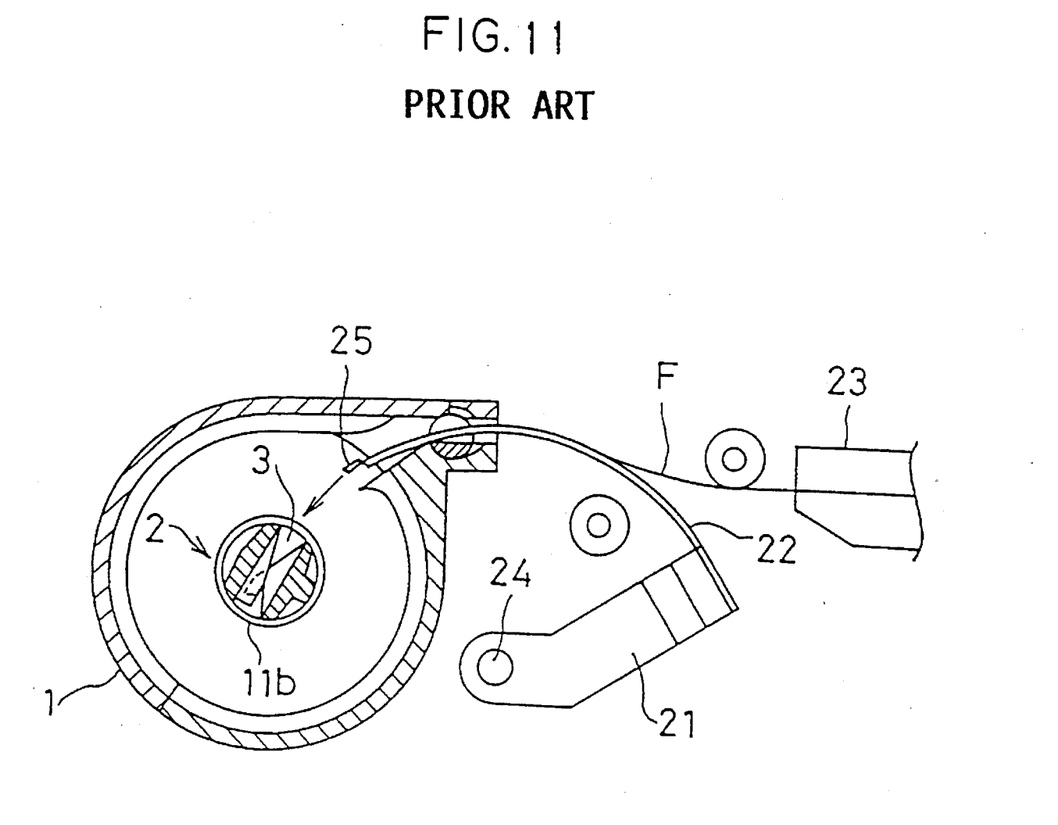
FIG. 11 is an explanatory view explaining a conventional photographic film guiding operation.
Figure 12:
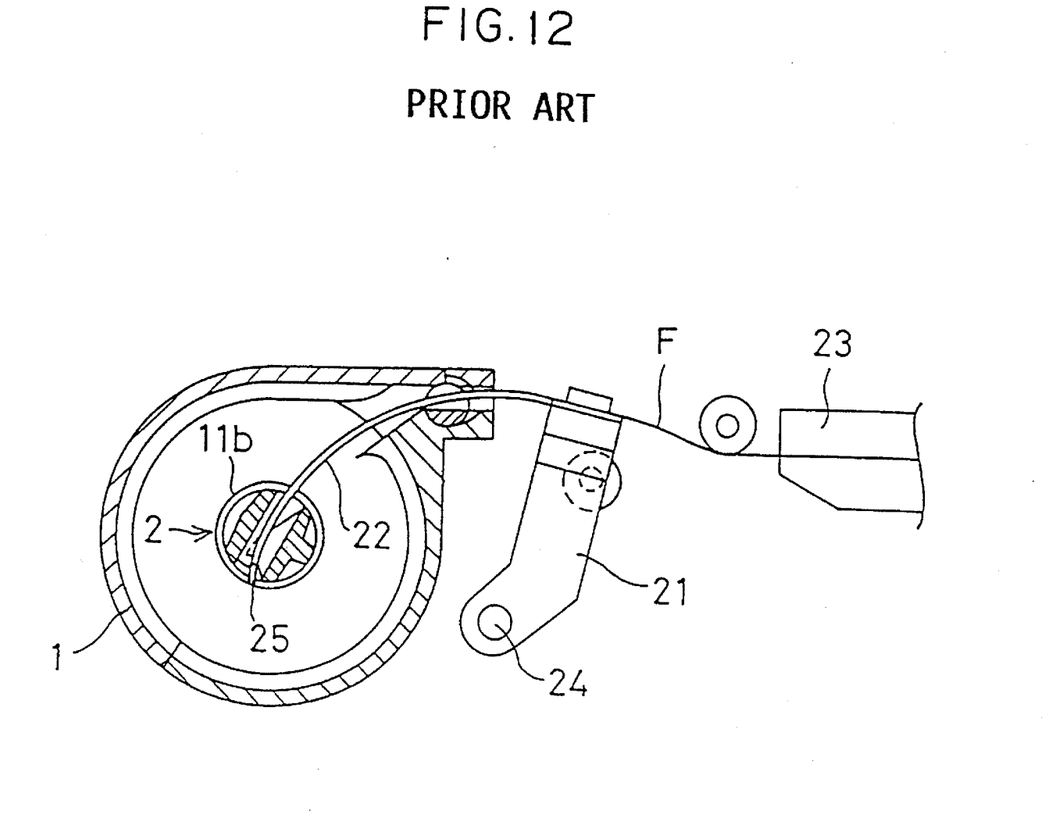
FIG. 12 is an explanatory view explaining a conventional photographic film engaging operation.

An example of a conventional photographic film take-up method and the main portions of a photographic film take-up device will be described hereinafter with reference to FIGS. 10 through 16 as an application of the technology of the above-mentioned cartridges. As illustrated in FIGS. 10 through 12, a spool 2 is provided so as to be freely rotatable within a cartridge main body 1. A slit 3 for insertion of a photographic film F is formed in an outer circumferential surface of the spool 2. Further, a slit-shaped film path 4 is formed in the cartridge main body 1. A cover member 6 is provided between the film path 4 and a film accommodating portion 5 within the cartridge main body 1 so as to be freely openable and closable.

Figure 13:
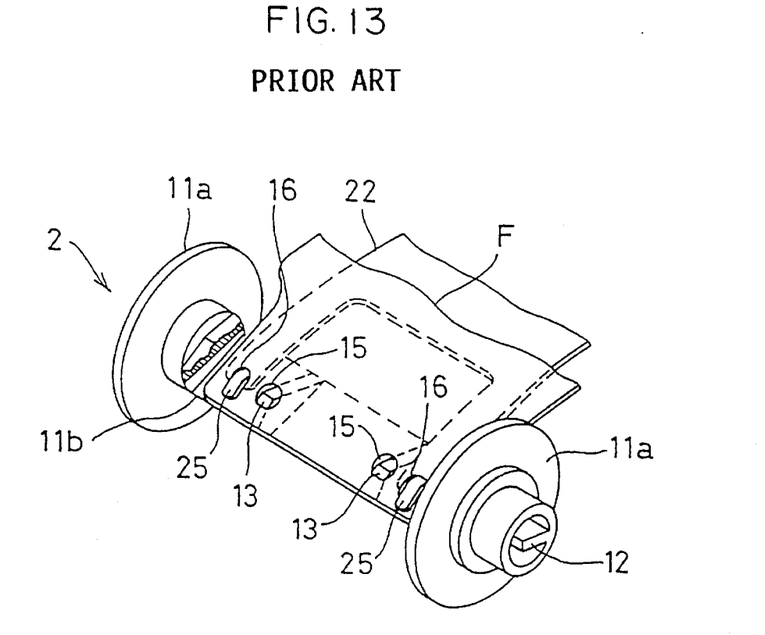
FIG. 13 is a perspective view explaining a conventional photographic film engaging operation.

As shown in FIG. 13, a pair of flanges 11a are formed integrally with the spool 2, and the photographic film F is wound around a shaft portion 11b of the spool 2. Both ends of the spool 2 are exposed at the side surfaces of the cartridge main body 1, and keys 12 are provided at the exposed portions. When the spool 2 is rotated, the keys 12 engage with a member for driving the spool.

The slit 3 is formed in the shaft portion 11b. A pair of pawls 13 and presser ribs 14 are provided at an interior portion of the slit 3. The presser ribs 14 project between the pawls 13.

A pair of engagement holes 15 are formed in the trailing end portion of the photographic film F. When the photographic film F is taken up, the engagement holes 15 are engaged by the pawls 13 due to a pair of arms 21 and a pawl plate 22 which will be described later. After engagement, the trailing end of the photographic film F is pressed by the presser ribs 14 so that the trailing end does not rise up. Therefore, the engagement of the pawls 13 and the engagement holes 15 is maintained. Even if force is applied in a direction of pulling the photographic film F out from the slit 3, the photographic film F is not pulled out therefrom.

A pair of holes 16 are formed in the trailing end of the photographic film F at positions at the outer sides of the engagement holes 15. The holes 16 are used when the trailing end of the photographic film F is inserted into the slit 3.

When the photographic film F is taken up, the cartridge main body 1 is fixed at a take-up device, and the photographic film F which is supplied from a film guide 23 is taken up thereon. The pair of arms 21 and the pawl plate 22 are used in the taking-up of the photographic film F.

Namely, the pair of arms 21 are respectively connected to a mounting plate and rotate reciprocally around a shaft 24 due to an unillustrated stepping motor or the like. The pawl plate 22 is formed by a thin metal plate which is curved into a circular arc shape, and a pair of pawls 25 are provided at the end thereof.

As illustrated in FIG. 10, when the photographic film F is delivered from the film guide 23, the pair of arms 21 rotates in a counterclockwise direction synchronously with the delivery of the photographic film F, so that the pawls 25 engage the holes 16. In this state, when the pair of arms 21 continues to rotate, as illustrated in FIG. 11, the trailing end of the photographic film F becomes integral with the pawl plate 22 and enters into the film accommodating portion 5 from the film path 4. Next, as illustrated in FIG. 12, the trailing end portion of the photographic film F enters into the spool 2 from the slit 3.

As a result, the engagement holes 15 engage the pawls 13, and the trailing end of the photographic film F is engaged with the spool 2. Subsequently, the pair of arms 21 is rotated in a clockwise direction so that the pawls 25 are removed from the holes 16. The pawl plate 22 is removed to the exterior of the cartridge main body 1, and the spool 2 is rotated in the counterclockwise direction so that the photographic film F is taken up. The rotation of the spool 2 is effected by the keys 12 engaging the members for driving.

Figure 14:
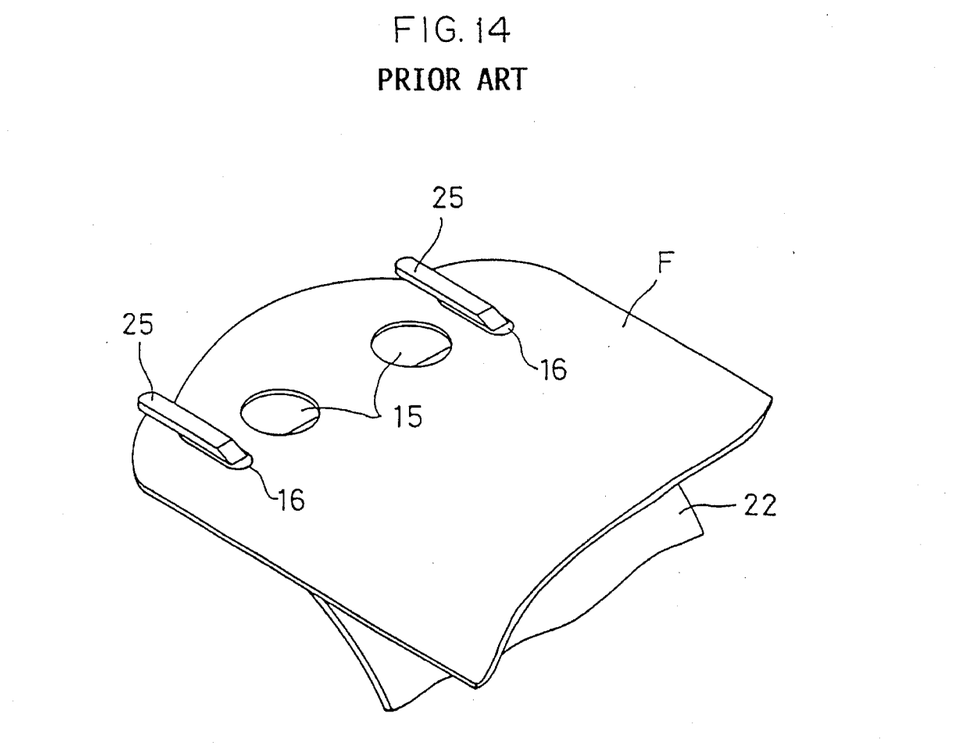
FIG. 14 is a perspective view illustrating a conventional state of guiding a photographic film.
Figure 15:
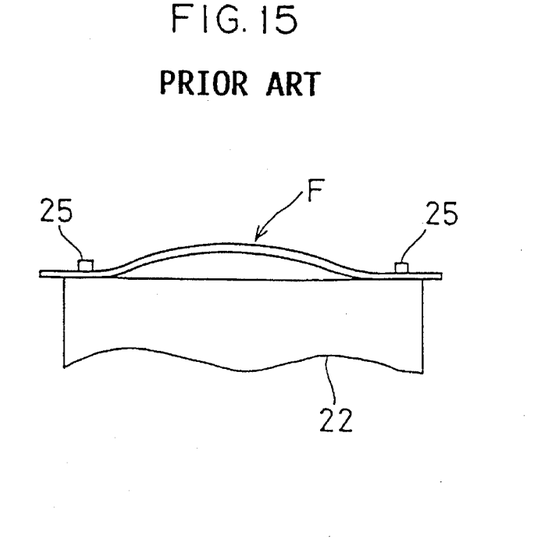
FIG. 15 is a sectional view illustrating deformation of a photographic film in the prior art.

As illustrated in FIG. 14, the pawls 25 engage the two holes 16, and the trailing end of the photographic film F is guided to the spool 2 while both sides of the trailing end are pulled. At this time, because the photographic film F is being pulled at two places, i.e., the two sides, as illustrated in FIG. 15, the central portion of the photographic film F swells and curls into a trough shape.

Figure 16:
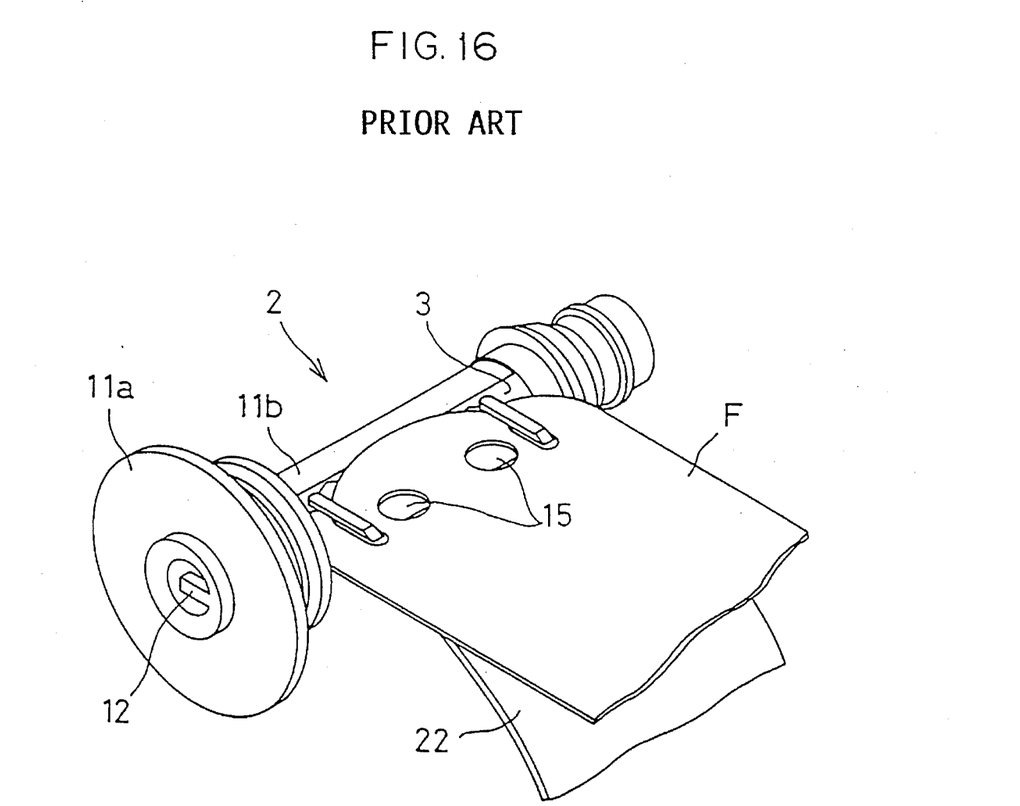
FIG. 16 is a perspective view of main portions, and illustrates a catching of a photographic film in the prior art.

If this type of a trough shape is formed, when the photographic film F is guided to the spool 2 and inserted into the slit 3, as illustrated in FIG. 16, the portion which is curled into a trough shape abuts the shaft portion 11b of the spool 2 and cannot be inserted into the slit 3. In this case, the engagement holes 15 cannot be engaged by the pawls 13, and the photographic film F cannot be taken up.

When the photographic film F is to be taken up, it is preferable that the width of the slit 3 be narrow in consideration of the conveyability of the film when the film is pulled out from the cartridge main body 1 for use.

However, when a trough-shape curl is formed in the photographic film F as described above, if the width of the slit 3 is narrow, it is even more difficult than described above for the photographic film F to be taken up. In order to improve the conveyability of the film, a highly precise insertion operation is needed in a case in which the gap of the slit 3 of the spool 2 is narrow. Therefore, there is a need to avoid the interference between the spool and the film as described above.

SUMMARY OF THE INVENTION

In view of the aforementioned, an object of the present invention is to provide a photographic film take-up device in which, when one end of a photographic film is engaged with a spool within a cartridge main body while being guided, the guiding and engagement can be effected reliably and smoothly.

One aspect of the present invention is a photographic film take-up device comprising: holding means for holding, in a fixed posture, a cartridge main body, the cartridge main body accommodating a spool having a trailing end engaging means in an interior thereof, the trailing end engaging means engaging a longitudinal direction trailing end portion of an elongated photographic film, an interior portion of the cartridge main body being able to be maintained in a state of being shielded from light; and guiding means having engaging means which engages the longitudinal direction trailing end portion of the photographic film, and engaging the engaging means with the longitudinal direction trailing end portion of the photographic film, and guiding the engaging means and the longitudinal direction trailing end portion of the photographic film to the spool via a film path provided in the cartridge main body, and engaging the longitudinal direction trailing end portion of the photographic film with the trailing end engaging means, wherein the engaging means is provided at a leading end portion of the guiding means in a direction of guiding the photographic film to the spool, and the engaging means engages an engagement hole provided in a transverse central portion of the photographic film at the longitudinal direction trailing end portion thereof.

In accordance with the above-described aspect, an engagement hole is formed in the central portion, with respect to the transverse directions, of the longitudinal direction trailing end portion of the photographic film. An engaging means is formed at a leading end portion of the guiding means in a direction of guiding the photographic film to the spool. The engaging means engages the engagement hole, and the photographic film is guided by the guiding means to the trailing end engaging means of the interior of the spool via a film path, so that the longitudinal direction trailing end portion of the photographic film engages with the trailing end engaging means. Accordingly, curling of the photographic film, such that the central portion, with respect to the transverse direction of the longitudinal direction trailing end portion of the photographic film becomes concave, is deterred. Further, the photographic film can be reliably guided to the trailing end engaging means within the spool without getting caught on the outer surface of the spool. In this way, the taking-up of the photographic film can be effected reliably and smoothly.

Another aspect of the present invention is a photographic film take-up device in which a longitudinal direction trailing end portion of an elongated photographic film engages with an engaging portion of a cartridge main body whose interior portion is maintained in a state of being shielded from light and which holds a spool, which has the engaging portion at an interior thereof, such that the spool is freely rotatable, the photographic film take-up device taking-up the photographic film on the spool and accommodating the photographic film, comprising: an elongated plate member which is driven such that a longitudinal direction leading end portion of the elongated plate member reaches the spool via a path provided in the cartridge main body; and engaging means, provided at a central portion of the longitudinal direction leading end portion of the plate member, for engaging a hole formed in a transverse direction central portion of the longitudinal direction trailing end portion of the photographic film.

In accordance with the above-described aspect, the engaging means provided at the central portion, with respect to the transverse direction, of the longitudinal direction leading end portion of the plate member engages the hole which is formed in the central portion, with respect to the transverse direction of the longitudinal direction trailing end portion of the photographic film. Accordingly, in this aspect of the present invention as well, curling of the photographic film, such that the central portion of the longitudinal direction trailing end portion of the film becomes concave, is deterred.

Yet another aspect of the present invention is a method of taking up a photographic film in which a longitudinal direction trailing end portion of an elongated photographic film engages with an engaging portion of a cartridge main body whose interior portion is maintained in a state of being shielded from light and which holds a spool, which has the engaging portion at an interior thereof, such that the spool is freely rotatable, and in which the photographic film is taken up on the spool and accommodated, the method comprising the steps of: (a) engaging an engaging member, which is provided at a leading end portion of a guiding member, with a hole formed in a central portion of the longitudinal direction trailing end portion of the photographic film; and (b) driving the guiding member, whose engaging member is engaged with the hole, so that the longitudinal direction trailing end portion of the photographic film and the engaging member are moved within the cartridge main body via a path which is formed in the cartridge main body, and engaging the longitudinal direction trailing end portion of the photographic film with the engaging member which is within the spool.

In the above-described aspect as well, because the engaging member which is provided at the leading end portion of the guiding member is engaged with the hole formed in the central portion, with respect to the transverse direction of the longitudinal direction trailing end portion of the photographic film, formation of a concave curl in the central portion of the longitudinal direction trailing end portion of the photographic film is deterred.

An engaging pawl may be used as the engaging means and the engaging member.

DESCRIPTION OF THE PREFERRED EMBODIMENTS

A first embodiment of the present invention will be described hereinafter with reference to the drawings.

Figure 1:
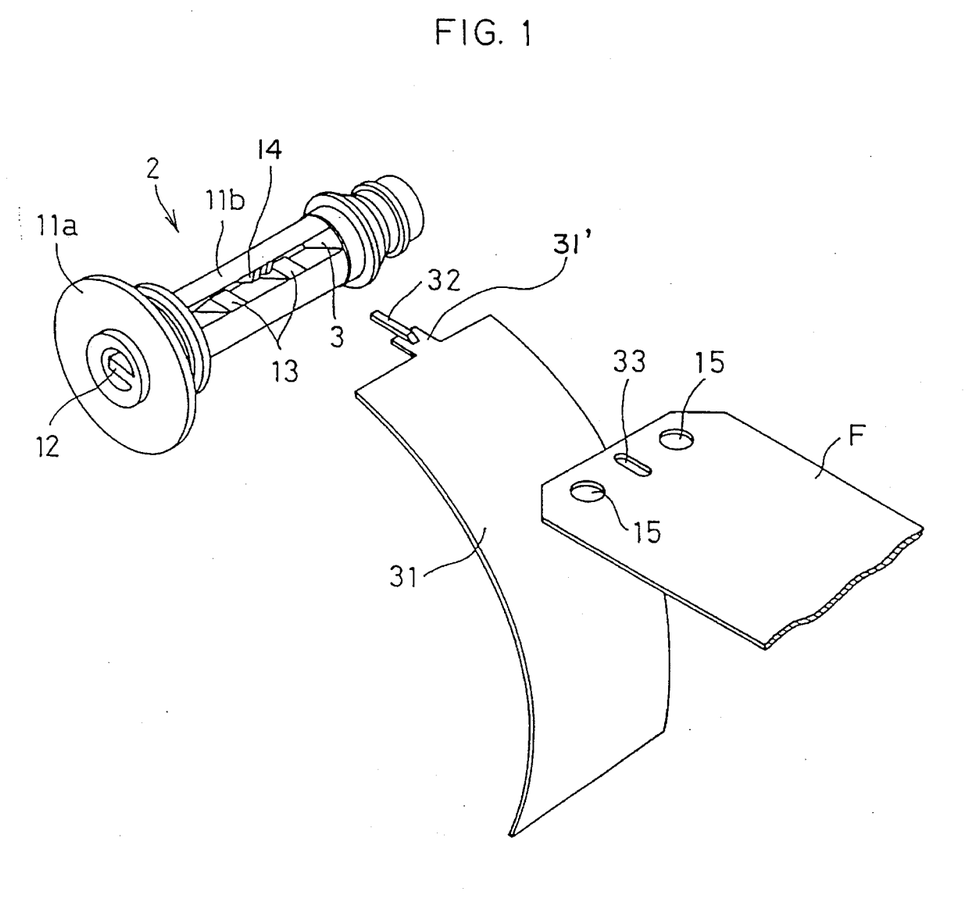
FIG. 1 is a perspective view of a photographic film, a pawl plate and a spool, and illustrates a first embodiment of the present invention.
Figure 2:
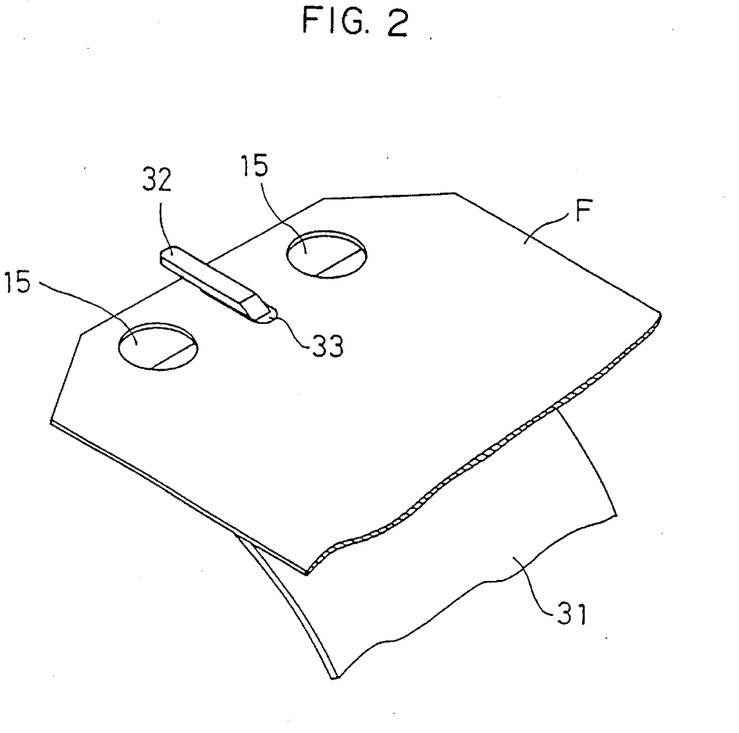
FIG. 2 is a perspective view illustrating engagement of the photographic film.
Figure 3:
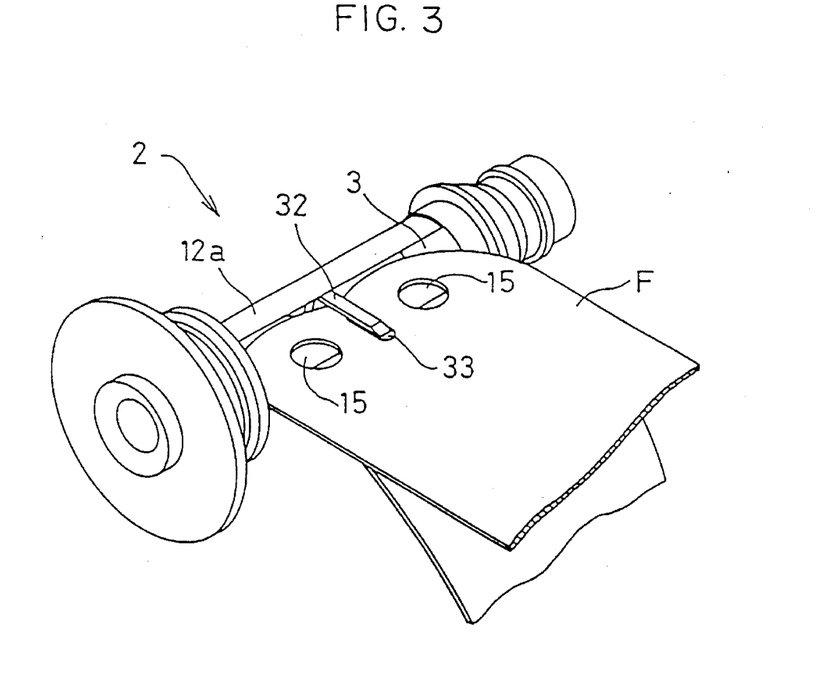
FIG. 3 is a perspective view illustrating guiding to the spool.
Figure 4:
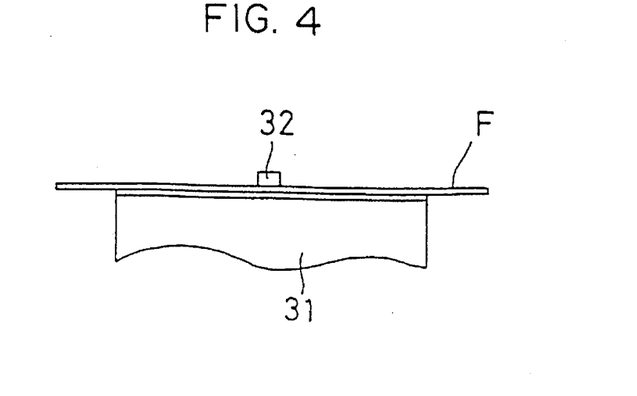
FIG. 4 is a sectional view illustrating a configuration of main portions of the photographic film.
Figure 5:
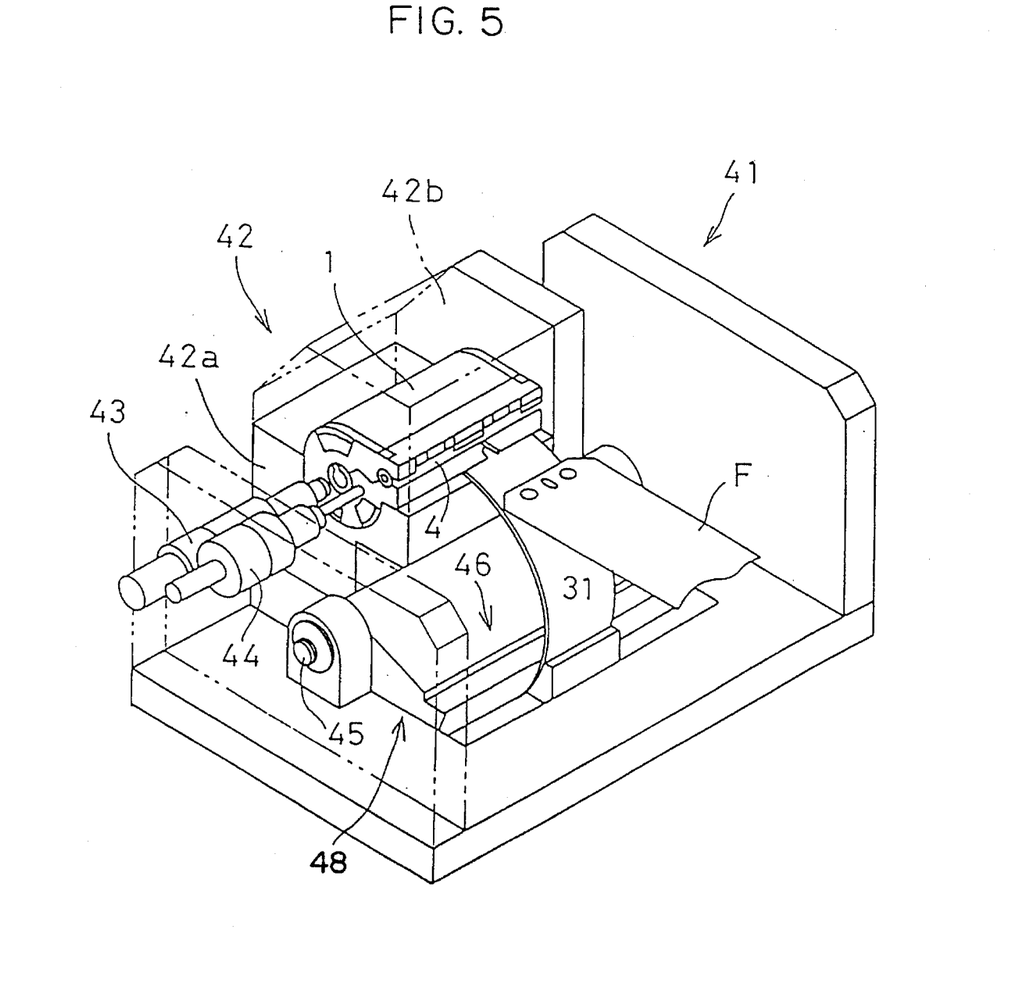
FIG. 5 is a transparent perspective view illustrating a structure of a photographic film take-up device.

FIG. 1 is a perspective view illustrating the relation between a photographic film, a pawl plate and a spool. FIG. 2 is a perspective view illustrating engagement of the photographic film. FIG. 3 is a perspective view illustrating guiding to the spool. FIG. 4 is a sectional view illustrating main portions of the photographic film. FIG. 5 is a transparent perspective view illustrating a structure of a photographic film take-up device. Drawings and reference numerals referenced in the description of the prior art will be used appropriately in the description of the present embodiments.

The cartridge main body 1 (see FIG. 5) is structured similarly to the cartridge main body 1 described as prior art, and members having the same operation are denoted by the same reference numerals. As can be seen in FIG. 1, an elongated, substantially rectangular pawl plate 31 of the present embodiment has a substantially rectangular protruding portion 31' at the central portion of the leading end in the longitudinal direction thereof. A single pawl 32 is provided at the protruding portion 31'. A hole 33 is formed in the trailing end of the photographic film F (i.e., the front end in the direction of inserting the photographic film F into the spool 2) in a central portion of the photographic film F with respect to the transverse direction thereof. The hole 33 is long and thin and the longitudinal direction thereof is the same as that of the photographic film F. Further, circular holes 15 are formed in the photographic film F at the sides of the hole 33 in the transverse direction of the photographic film F.

The structure for supplying the photographic film F from the film guide 23 and the structure for rotating the pawl plate 31 may be the same as those of the conventional art.

When the trailing end of the photographic film is inserted into and engaged with the spool 2, in the same way as described above, the pawl plate 31 is rotated synchronously with the supplying of the photographic film F, and the pawl 32 engages the hole 33 as shown in FIG. 2. Next, the trailing end of the photographic film F is pulled by the rotation of the pawl plate 31, is guided to the spool 2, and is inserted into the shaft portion 11b from the slit 3. Further, as illustrated in FIG. 13, the engagement holes 15 are engaged by the pawls 13.

After the engagement holes 15 have been engaged by the pawls 13, the pawl plate 31 is rotated in the opposite direction such that the pawl 32 is removed from the hole 33 and the pawl plate 31 is pulled out to the exterior of the spool main body 1. Next, the spool 2 is rotated so that the photographic film F is taken up.

During the time when the photographic film F is taken up in this way, the following operation is effected due to the provision of the single pawl 32. Namely, from the time that the pawl 32 is engaged with the hole 33 as illustrated in FIG. 2, the central portion of the trailing end of the photographic film F is pulled at only one place. As a result, the trailing end portion of the photographic film F is shaped substantially as a flat plate as illustrated in FIG. 4, and no trough shaped (convex) curl is formed as in the conventional devices.

Accordingly, the pawl plate 31 is rotated, and when the trailing end of the photographic film F is guided to the position at which it opposes the slit 3, as illustrated in FIG. 3, and is inserted into the slit 3, the trailing end of the photographic film F does not abut the shaft portion 11b and is smoothly and reliably inserted into the slit 3. Subsequently, the trailing end can be engaged with the pawls 13.

Next, a photographic film take-up device (hereinafter referred to simply as "film take-up device") will be described with reference to FIG. 5.

The structure of a film take-up device 41 can be broadly divided into a rotating portion 48, which rotates the pawl plate 31 and a set portion 42 in which the cartridge main body 1 is set; a spool driving portion 43 which rotates the spool 2; and an opening/closing portion 44 which opens and closes the cover member 6. A shaft 45 serves as the shaft around which the pawl plate 31 rotates. A cylindrical rotating member 46 is provided in place of the pair of arms 21 in the conventional art. The pawl plate 31, which is circular arc shaped when viewed from the side, is mounted at the circular arc shaped outer side surface of the rotating member 46.

The set portion 42 is provided with a base portion 42a and a cover portion 42b which opens and closes with the rear end side as a fulcrum. When the cartridge main body 1 is to be set in the set portion 42, the cover portion 42b is opened, and the cartridge main body 1 is accommodated on the base portion 42a. The cover portion 42b is then closed. As a result, as illustrated in FIG. 5, the cartridge main body 1 is positioned and fixed in a state in which the film path 4 is oriented toward the photographic film F.

In this state, the photographic film F is supplied from the film guide 23 (see FIG. 10) in the direction of the film path (entrance) 4. Further, the pawl plate 31 is rotated in a counterclockwise direction in FIG. 5. As described with reference to FIGS. 1 through 3, the pawl 32 engages the hole 33, and the film F, together with the pawl plate 31, is inserted into the cartridge main body 1. The pawls 13 protruding at the inner side of the slit 3 are engaged with the engagement holes 15. After the pawl plate 31 is rotated in the clockwise direction in FIG. 5 and is removed from the cartridge main body 1, the spool 2 is rotated by the spool driving portion 43, and the photographic film F is taken up into the interior of the cartridge main body 1.

Because no trough-shaped curl is formed in the trailing end of the photographic film F as described above when this series of taking-up processes is effected, the taking-up operation can be effected smoothly. Further, when the pawl plate 31 is removed, the pawl 32 and the hole 33 are engaged in one place. Therefore, there is only slight resistance to the removal of the pawl plate 31, and the pawl plate 31 can be removed reliably and smoothly. In particular, even if the gap of the slit 3 of the spool 2 is formed so as to be narrow in order to improve the conveyability of the film F, the film F can be reliably inserted in to the slit 3.

Figure 6:
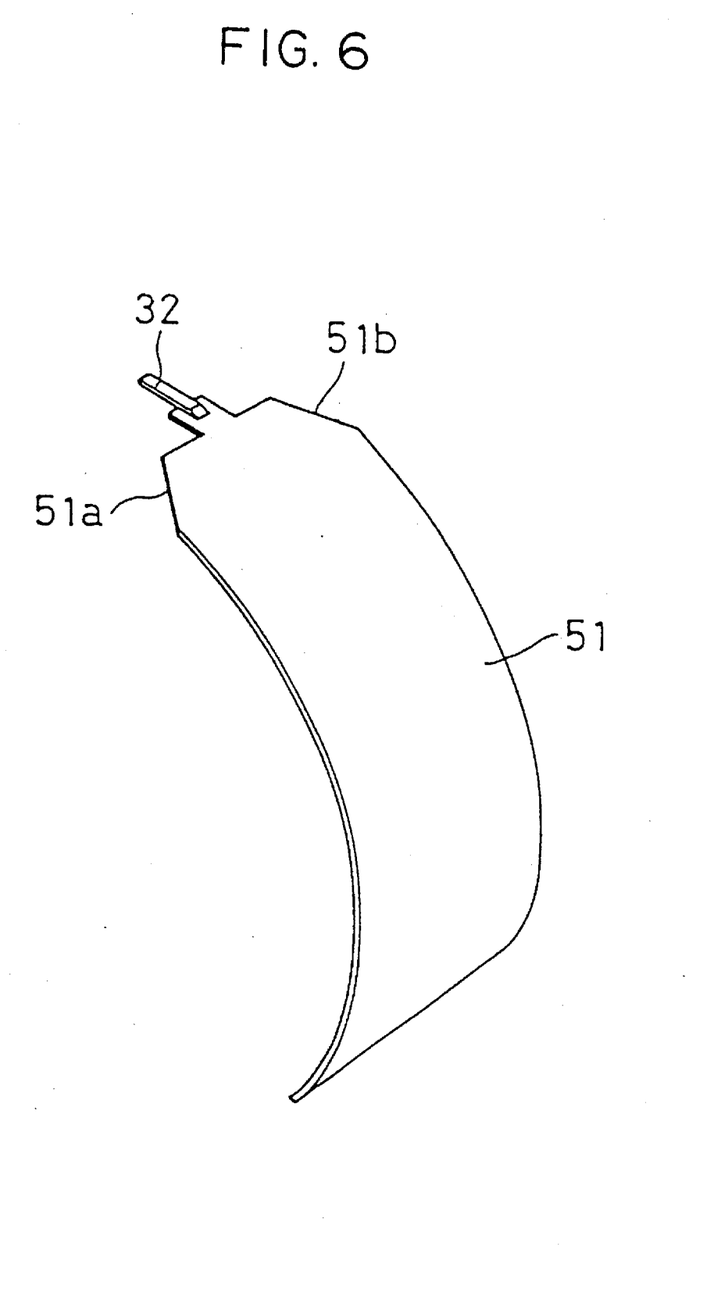
FIG. 6 is a perspective view of a pawl plate, and illustrates a second embodiment of the present invention.

Next, a second embodiment of the present invention will be described with reference to FIG. 6. The difference between the present embodiment and the first embodiment is that, in the present embodiment, the corner portions of the leading end of a pawl plate 51 are cut so that the pawl plate 51 does not abut the engagement pawls 13 when the pawl plate 51 is inserted into the slit of the spool 2.

Namely, corners 51a, 51b of the leading end portion of the pawl plate 51 relating to the present embodiment are cut to define angled surfaces. The position at which the single pawl 32 is provided, the configuration of the pawl 32 and the like are the same as described above. In accordance with this structure, when the pawl plate 51 is rotated in the same way as described above and is inserted into the slit 3, the pawl plate 51 does not catch on the shaft portion 11b, and the insertion operation can be effected even more smoothly. Further, the insertion of the photographic film F and the engagement of the film can be effected simultaneously.

Figure 7A:
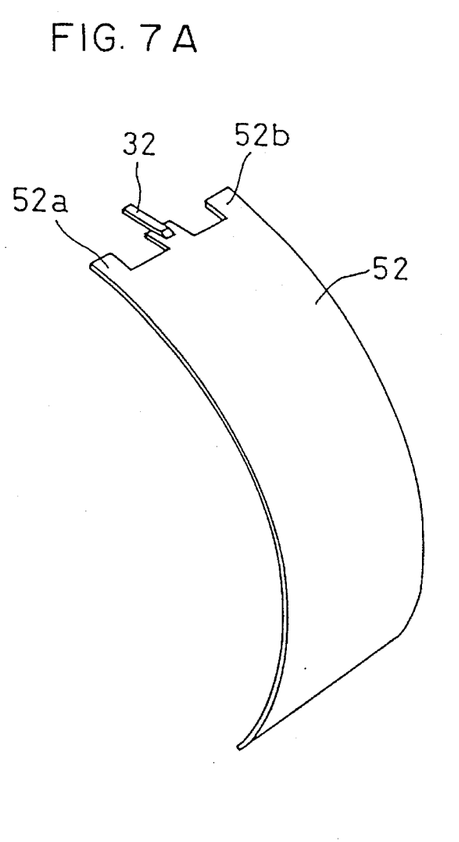
FIGS. 7A and 7B are perspective views of a pawl plate, and illustrate a third embodiment of the present invention.

Next, a third embodiment of the present invention will be described with reference to FIGS. 7A and 7B. The difference between the present embodiment and each of the previous embodiments is that the present embodiment is structured such that even a photographic film having an undesirable curl can be taken up smoothly.

Namely, a curl may be formed in the leading end of the photographic film F due to handling during the photographing of the film or the like. Curls form easily at the transverse direction sides of the photographic film F in particular. Therefore, as illustrated in FIGS. 7A and 7B, extended portions 52a, 52b are formed at the transverse direction side ends of the leading end portion of a pawl plate 52 of the present embodiment, and support the curled portions of the photographic film F from below. The extended portions 52a, 52b are provided so as to be positioned at the respective outer sides of the engagement pawls 32 when the pawl plate 52 is inserted into the spool 2. In accordance with this structure, even if, for example, both sides of the leading end of the photographic film F are curled downwardly, the sides are supported from below and are corrected by the extended portions 52a, 52b such that the pawl plate 52 can be smoothly inserted into the slit 3.

Figure 7B:
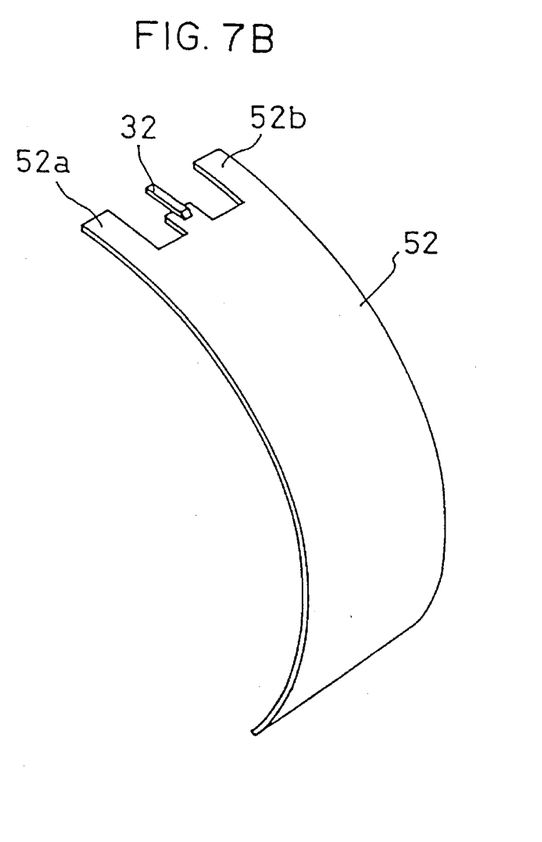

As illustrated in FIG. 7B in particular, providing longer extended portions 52a, 52b at the side ends of the pawl plate 52 allows the curl of the photographic film F to be corrected reliably.

Figure 8:
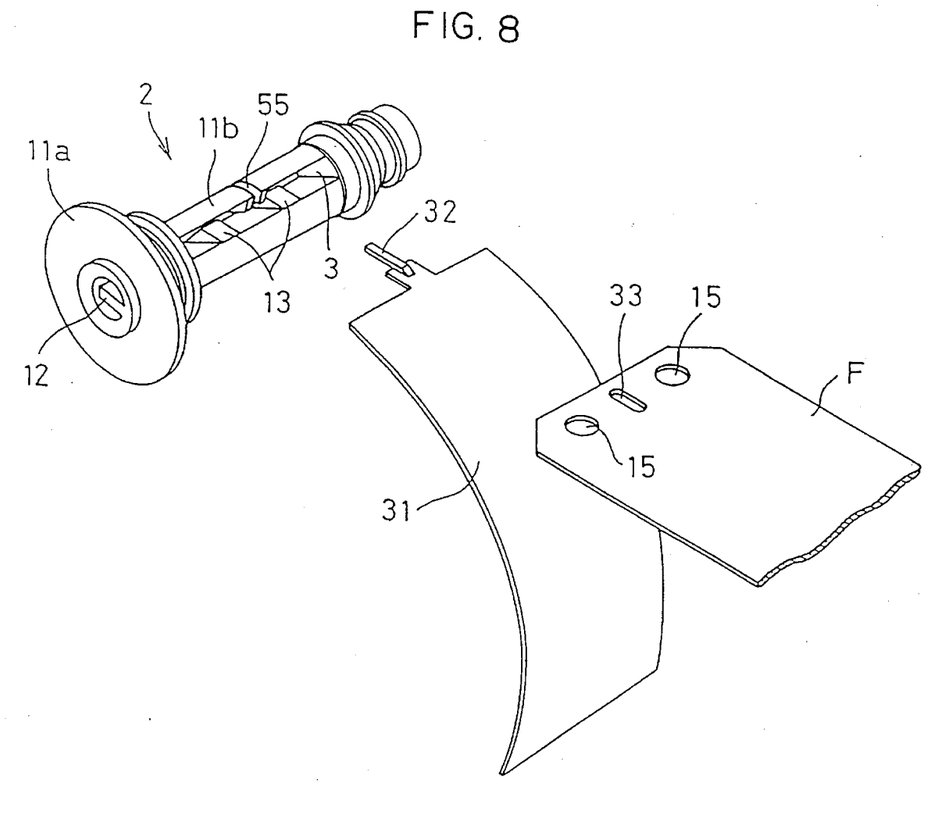
FIG. 8 is a perspective view of a spool and a pawl plate, and illustrates a fourth embodiment of the present invention.
Figure 9:
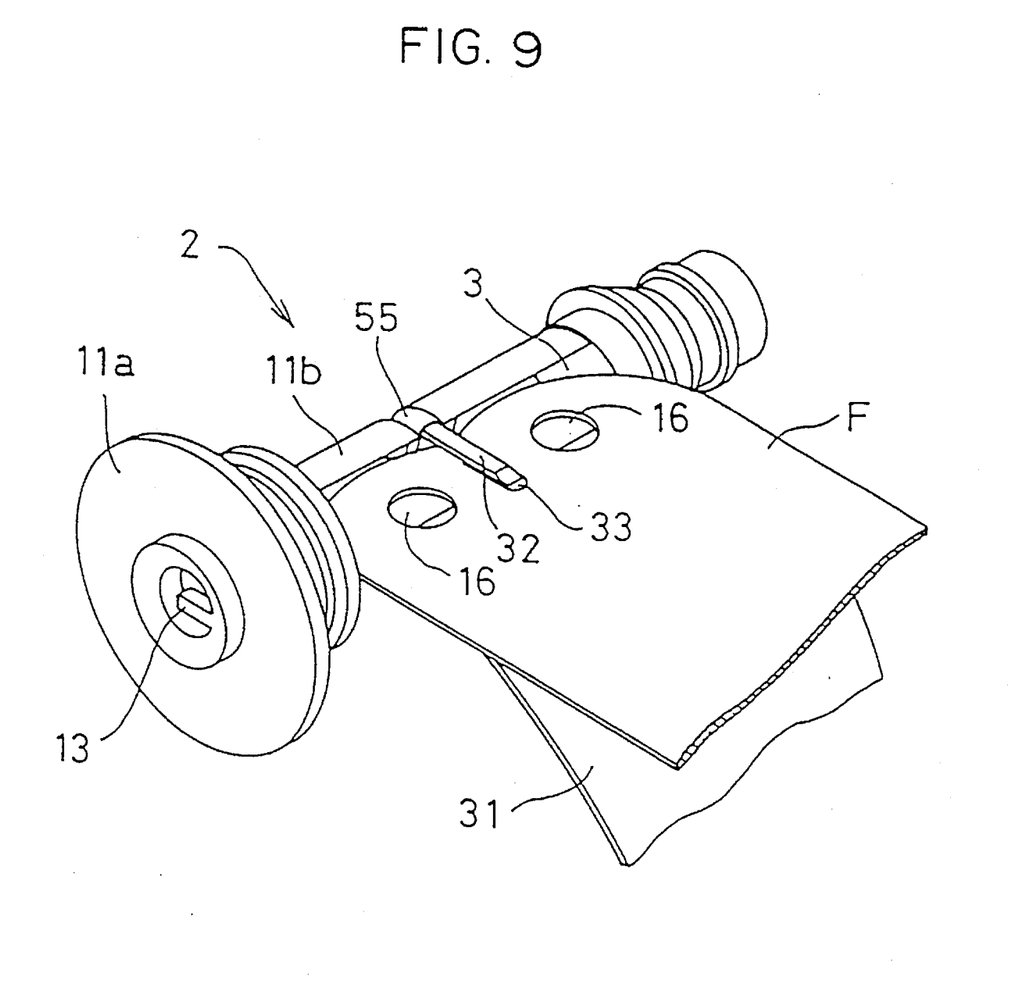
FIG. 9 is a perspective view of main portions, and illustrates a state of guiding to the slit.

Next, a fourth embodiment of the present invention will be described with reference to FIGS. 8 and 9. The fourth embodiment relates to a configuration of the spool 2 which further improves the taking-up operation when the photographic film F is taken up by the pawl plates 31, 51, 52 described in the previous embodiments.

Namely, a pawl insertion groove 55 is formed in the outer surface of the shaft portion 11b forming the spool 2 in a substantially central portion in the axial direction thereof. The pawl insertion groove 55 is formed in a groove shape along the outer circumferential portion of the shaft portion 11b. The width of the pawl insertion groove 55 is slightly larger than that of the pawl 32. Further, the pawl insertion groove 55 communicates with the slit 3. Accordingly, when the pawl plate 31 which is engaged with the photographic film F rotates and the leading end of the pawl 32 inserted through the hole 33 approaches the slit 3, the leading end of the pawl 32 is inserted into the pawl insertion groove 55 and does not strongly abut the shaft portion 11b.

As a result, damage and deformation of the pawl 32 can be prevented and the stress load on the entire pawl plate 31 can be reduced so that the durability of the pawl plate 31 can be improved.

Further, because the photographic film F is interposed between the pawl plate 31 and the spool 2, damage thereto can be prevented.

The present invention is not limited to the above-described embodiments and a variety of modifications are possible. For example, the cut configuration of the second embodiment may be formed at the outer sides of the elongated portions 52a, 52b of the third embodiment.

As described above, in the photographic film take-up device relating to the present invention, a single engaging means is provided in the substantial center of the leading end portion of a guide member, and a hole which engages with the engaging means is provided in a substantial center of the trailing end portion of the photographic film. When the trailing end portion of the photographic film is to be engaged with a spool within a cartridge main body, the photographic film is guided to the spool while one place of the trailing end portion thereof is pulled, and the trailing end portion of the photographic film engages with pawls formed within the spool.

Accordingly, the trailing end portion of the photographic film is pulled at only one place, and no trough-shaped curl is formed in the photographic film. Therefore, the trailing end of the photographic film can be reliably and smoothly inserted into the spool from the slit formed in the spool. As a result, the efficiency of the operation of taking-up the photographic film can be improved, and the reliability of the manufactured product can be improved.

What is claimed is:

1. A photographic film take-up device comprising:

holding means for holding, in a fixed posture, a cartridge main body, said cartridge main body accommodating a spool having a trailing end engaging means in an interior thereof, said trailing end engaging means being adapted to engage a longitudinal direction trailing end portion of an elongated photographic film which has an engagement hole provided in a transverse direction central portion thereof, an interior portion of said cartridge main body being adapted to be maintained in a state of being shielded from light; and guiding means having an elongated plate member whose longitudinal direction is the direction of guiding photographic film to said spool, and having engaging means which is comprised of a single engaging projection adapted to engage into an engagement hole formed in a film, said engaging means is provided at a transverse direction central portion of said plate member at a leading end portion thereof in the direction of guiding a photographic film to said spool said guiding means guiding said engaging means to said spool via a film path provided in said cartridge main body to thereby provide for engaging a longitudinal direction trailing end portion of photographic film with said trailing end engaging means, said plate member being provided with a deterring means which includes a projection portion respectively provided at each transverse direction end of said plate member at the leading end portion thereof in the direction of guiding photographic film to said spool, said projection portions extending beyond the transverse direction ends in the direction of guiding the photographic film to said spool, for deterring formation of curls at both transverse direction ends of photographic film at a longitudinal direction trailing end portion thereof.

2. A photographic film take-up device according to claim 1, wherein said spool has a slit into which said engaging means enters when engaging a longitudinal direction trailing end of photographic film engages with said trailing end engaging means.

3. A photographic film take-up device according to claim 2, wherein said slit communicates with an interior portion of said spool.

4. A photographic film take-up device according to claim 1, wherein said spool has a slit into which said engaging projection enters when engaging a longitudinal direction trailing end of photographic film with said trailing end engaging means.

5. A photographic film take-up device in which a longitudinal direction trailing end portion of an elongated photographic film having a hole formed in a transverse direction central portion thereof, engages with an engaging portion of a cartridge main body whose interior portion is maintained in a state of being shielded from light and which holds a spool, and which has said engaging portion at an interior thereof, such that said spool is freely rotatable, said photographic film take-up device taking-up the photographic film on said spool and accommodating the photographic film, said device comprising:

an elongated plate member including abutting portions which are adopted to abut both side portions of a longitudinal direction trailing end portion of photographic film when the side portions curl toward said plate member, said elongated plate member being driven such that a longitudinal direction leading end portion of said elongated plate member reaches said spool via a path provided in said cartridge main body;

said abutting portions are projecting portions which project from transverse direction end portions of the longitudinal direction leading end portion of said plate member in the direction of guiding photographic film to said spool; and engaging means including an engaging pawl and being provided at a transverse direction central portion of the longitudinal direction leading end portion of said plate member, said engaging means being adapted to engage a hole formed in photographic film.

6. A photographic film take-up device according to claim 5, wherein both transverse direction ends of the longitudinal direction leading end portion of said plate member have notches formed therein.

7. A photographic film take-up device according to claim 5, wherein said spool has a slit into which said engaging pawl enters when engaging a longitudinal direction trailing end portion of photographic film with said engaging portion.

8. A photographic film take-up device according to claim 7, wherein said silt communicates with an interior portion of said spool.

9. A method of taking up a photographic film in which a longitudinal direction trailing end portion of an elongated photographic film engages with an engaging portion of a cartridge main body whose interior portion is maintained in a state of being shielded from light and which holds a spool, which has said engaging portion at an interior thereof, such that said spool is freely rotatable, and in which the photographic film is taken up on said spool and accommodated, said method comprising the steps of:

(a) engaging an engaging member, which is provided at a leading end portion of a guiding member which is supported on a cylindrical body which rotates around a shaft, said engaging member being driven by rotation of said cylindrical body, with a hole formed in a transverse direction central portion of the longitudinal direction trailing end portion of the photographic film; and (b) driving said guiding member, whose engaging member is engaged with said hole, so that said engaging member is moved within said cartridge main body via a path which is formed in said cartridge main body, and engaging the longitudinal direction trailing end portion of the photographic film with said engaging member which is within said spool;

deterring the formation of curls in transverse direction end portions of the longitudinal direction trailing end portion of the photographic film during said step (b).

10. A method as recited in claim 9 wherein said deterring step is accomplished by projections extending from leading transverse ends of said leading end portion of said guide member.

11. A photographic film take-up device for engaging a longitudinal direction trailing end portion of an elongated photographic film with an engaging portion of a cartridge main body whose interior portion is shielded from light, which holds a spool, and which has said engaging portion at an interior thereof, such that said spool is freely rotatable, said photographic film take-up device being adapted to take up the photographic film on said spool and accommodating the photographic film, said device comprising:

an elongated plate member which is driven such that a longitudinal direction leading end portion of said elongated plate member reaches said spool via a path provided in said cartridge main body, both transverse direction ends of the longitudinal direction leading end portion of said plate member have notches formed therein; and engaging means, provided at a transverse direction central portion of the longitudinal direction leading end portion of said plate member, said engaging means being adapted to engage a hole formed in a transverse direction central portion of a longitudinal direction trailing end portion of photographic film.

12. A photographic film take-up device comprising:

holding means for holding, in a fixed posture, a cartridge main body, said cartridge main body accommodating a spool having a trailing end engaging means in an interior thereof, said trailing end engaging means being adapted engage a longitudinal direction trailing end portion of an elongated photographic film, an interior portion of said cartridge main body being shielded from light; and guiding means, including an elongated plate having engaging means which is adapted to engage a longitudinal direction trailing end portion of photographic film, said guiding means guiding said engaging means to said spool via a film path provided in said cartridge main body to thereby engage a longitudinal direction trailing end portion of photographic film with said trailing end engaging means;

deterring means for deterring formation of curls at both transverse direction ends of photographic film at a trailing end portion thereof, said deterring means being provided at both transverse ends of said plate member at the leading end portion thereof in the direction of guiding the photographic film to said spool, said deterring means comprising a projection portion which projects in the direction of guiding said photographic film to said spool;

wherein said engaging means is provided at a leading end portion of said guiding means in a direction of guiding the photographic film to said spool, and said engaging means is adapted to engage an engagement hole provided in a transverse direction central portion of photographic film at a longitudinal direction trailing end portion thereof.

13. A photographic film take-up device in which a longitudinal direction trailing end portion of an elongated photographic film engages with an engaging portion of a cartridge main body whose interior portion is shielded from light, which holds a spool, and which has said engaging portion at an interior thereof, such that said spool is freely rotatable, said photographic film take-up device taking-up the photographic film on said spool and accommodating the photographic film, said device comprising:

an elongated plate member which is driven such that a longitudinal direction leading end portion of said elongated plate member reaches said spool via a path provided in said cartridge main body, said plate member having abutting portions which are adapted to abut both side portions of a trailing end portion of photographic film; and engaging means, provided at a transverse direction central portion of the longitudinal direction leading end portion of said plate member, said engaging means being adapted to engage a hole formed in a transverse direction central portion of a longitudinal direction trailing end portion of photographic film.

* * * * *